June 17, 1952 C. KLEIN ET AL 2,601,030
CENTRIFUGAL BLOWER
Filed Nov. 29, 1948 2 SHEETS—SHEET 1

INVENTORS:
Chris Klein
Richard C. Skarin
William G. Tinker
By Bair & Freeman
Attys.

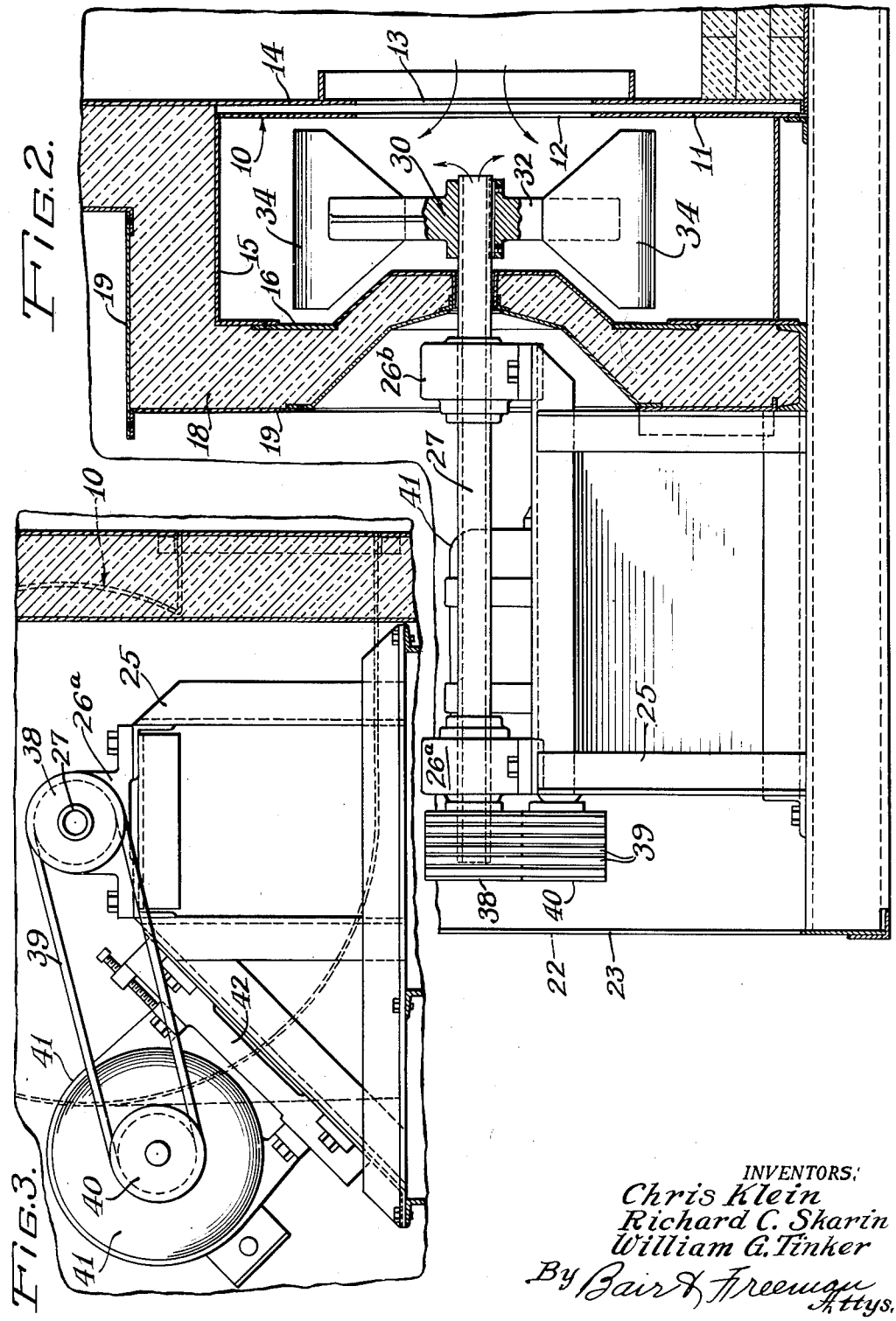

Patented June 17, 1952

2,601,030

UNITED STATES PATENT OFFICE 2,601,030

CENTRIFUGAL BLOWER

Chris Klein, Naperville, Richard C. Skarin, Western Springs, and William G. Tinker, Itasca, Ill., assignors to The Petersen Oven Company, Franklin Park, Ill., a corporation of Illinois Application November 29, 1948, Serial No. 62,522

1 Claim. (Cl. 230—127)

The present invention relates to centrifugal blowers, and more particularly blowers of the type adapted for handling high temperature air or gases in chambers and duct systems. In certain applications or uses of such blowers, the temperature of the air or gases being handled ranges up to 850° F. By way of example, air or gases handled by a blower in a commercial baking oven usually are in the range of 500° F. It is a known fact, however, that when such ovens are shut down, after operation, the residual heat in the system increases the temperature of the air or gases very substantially, and sometimes approximates a temperature range of 1500° F.

Manifestly, blowers subject to such high temperatures, due to their construction and due to the fact that they are directly exposed to high temperatures, result in heat being imparted from the blower section and impeller to the impeller shaft and the bearings. It has been found that such high temperatures result in excessive wear of the bearings, and even ball bearings, by impairment of the temper of the balls. Such excessive heat causes the oil of the bearings to deteriorate and form a sludge, which in turn causes binding of the bearings and warping and binding of the shaft. Such difficulties make it necessary to frequently lubricate and replace or recondition bearings and shafts of impellers when they are subjected to such high temperatures. Sometimes, due to the excessive load imposed on the electric motor driving such blowers, caused by binding of the shaft in the bearings, causes damage to the motor, requiring replacement thereof.

When apparatus, such as a commercial baking oven, must be shut down for purposes of making repairs or replacements in the blower installation, due to the above mentioned difficulties, not only is the baker subject to great inconvenience, but also sustains substantial expense and financial loss due to the inability to use the oven.

The foregoing difficulties have long been recognized by manufacturers of such blowers. Heretofore, one proposed solution to the problem was to employ water cooled bearings. Such an arrangement adds considerably to the cost of the blower installation and necessitates a constant water supply and maintenance of proper water pressure. In many instances water cooled bearings for a blower handling high temperature air or gases, have been found unsatisfactory because of scale formation produced in the ducts, which restricts the flow of water therethrough, and also because such scale often clogs the circulating system.

Certain large manufacturers of industrial blowers of the type adapted for handling high temperature air and gases have employed various types of "air slingers," usually mounted for rotation on the impeller shaft, adjacent the exterior of the impeller housing. Such slingers are in the form of vaned elements and create air currents adjacent one of the bearings for the intended purpose of cooling the bearings. Such devices have not, however, been found satisfactory because—

(a) The production of air currents adjacent the inner bearing, near the outer wall of the impeller housing, results in dissipation of the oil of said bearing, and necessitates frequent resupply of lubricant;

(b) Such air currents result in spreading of a film of oil on adjacent parts, such as the sheet metal shell or housing of the blower, and, due to the high temperature of the metal of the housing, presents a definite fire hazard;

(c) Such devices add considerably to the overhanging weight on the impeller shaft, and necessitates the use of shafts of a larger diameter;

(d) The air slingers require balancing for purposes of reducing strain and vibration caused by the high speed rotation of the impeller shaft; and (e) The increase in size of the impeller shaft required, together with the production of a balanced air slinger, adds considerable to the cost of the blower construction, without effecting adequate air cooling of the bearings.

One of the primary objects of the present invention is to provide a novel construction and arrangement of a blower for the purposes above indicated, which eliminates the above mentioned difficulties present in currently available blowers.

Another object is to provide a novel blower construction which insures a substantial reduction in wear and strain on the shaft and bearings, and which prevents dissipation and spreading of the oil of the bearings, and thus reduces possibility of fire, caused by oil from the bearings being spread directly on parts of the blower which are subject to high temperatures.

A further object is to provide a novel blower construction which is simple, compact, economical to manufacture and which produces definite and adequate air cooling of the bearings.

A more specific object is to provide a novel blower construction of the character indicated wherein there is provided a hollow impeller shaft, and wherein the blades of the impeller are constructed and arranged at the central area thereof so as to create, when rotating, a negative pressure or partial vacuum serving to positively draw air, at room temperatures, through the shaft into the impeller housing for effecting a cooling of the bearings.

Other objects and advantages of the present invention will be apparent from the following description, taken in connection with the accompanying drawings in which:

Figure 2 is a side elevational view of the blower, with the housing and impeller being shown part in section; and Figure 3 is a fragmentary end elevational view of the blower, taken substantially as indicated at line 3—3 on Figure 1.

Figure 1:
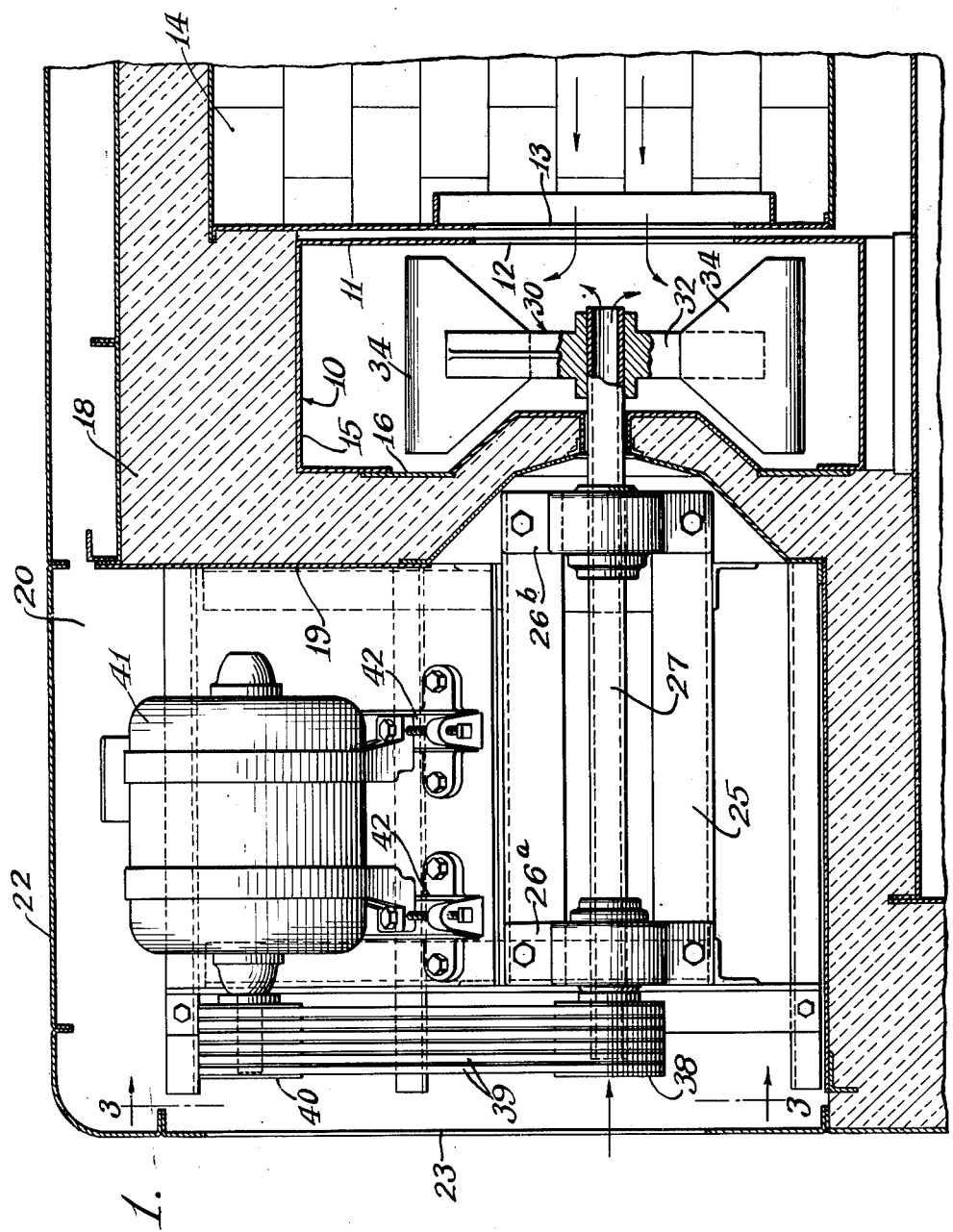
Figure 1 is a top plan view, part in section, of the novel blower construction embodying the present invention, shown for purposes of illustration in conjunction with a fragmentary portion of a baking oven.

As shown in the drawings, the blower includes a conventional form of impeller housing indicated at 10, having its forward or inner wall 11, formed with an inlet opening 12, in direct communication with an outlet opening 13 of a tunnel 14, associated with a conventional fire box of a heater unit, such as a gas or oil burner. The top wall 15 and outer wall 16 of the impeller housing are surrounded by a wall of suitable insulating material, as indicated generally at 18, held in position by a sheet metal retaining wall 19. It is to be understood that the baking chamber of the oven is surrounded by a wall of suitable insulating material.

As shown in Figure 1 of the drawings, the blower is located at one corner of the oven, adjacent the floor, and it will be noted that suitable space provision, as indicated generally at 20 is provided for various parts of the blower and the driving mechanism, within the outline of the oven, and as seen in Figure 1 of the drawings, said space is surrounded by a sheet metal shell 22, having an opening in the end wall, as indicated at 23, substantially in registration with the axis of the impeller of the blower.

The blower includes a suitable supporting frame 25, on which are mounted a pair of spaced apart bearings 26a and 26b providing journal support for a hollow impeller shaft 27, which is in the form of a tube. One end of said shaft extends beyond the innermost bearing 26b through the retaining wall 19 and outer wall 16 of the impeller housing 10. Rigidly mounted on said extending portion of the shaft, within the housing 10, is a suitable vaned impeller 30, which includes a plurality of outwardly extending arms 32, to the outer ends of which are attached vanes 34. Said vanes, as may be seen in the drawings, are tapered and reduce in cross sectional area, in the direction from the axis of the impeller shaft toward their outer ends, for purposes hereinafter described.

Mounted on the opposite end of the shaft 27 beyond the outermost bearing 26a is a pulley 38, around which is trained a plurality of belts 39, and which belts are also trained around a similar type of pulley 40, mounted on the drive shaft of the motor indicated at 41. The motor, as may be seen in Figure 3 of the drawings is adjustably mounted on base members 42, disposed at an incline to vertical, and carried by the frame structure 25. Such a mounting of the motor permits obtaining a compact arrangement and affords quick and easy adjustment for maintaining adequate tension in the drive belts 39.

Due to the fact that the blower is directly associated with high temperatures, both the impeller 30 and the driven pulley 38, are positioned on the shaft out of contact with the bearings and the impeller housing. It is to be understood that the bearings 26a and 26b are of conventional construction, and include features wherein certain elements of the bearings are locked to the shaft 27 to preclude axial movement of the shaft.

It will now be apparent that due to the form of the vanes 34, the central area of the impeller, when said impeller is rotating, creates a negative pressure or partial vacuum and permits air to flow freely into said central area of the impeller, and serves to positively draw air, at room temperatures through the duct or passageway of the hollow shaft 27, into the impeller housing. The constant flow of air at room temperature, through the shaft, insures adequate cooling of the bearings and thus prolongs their life, as well as effects a substantial reduction in repair and replacement, and in the supplying of lubricant to the bearings. The construction and arrangement is such as not to cause the production of air currents around the bearings and thus precludes spreading of a film of oil on the outer sheet metal retaining plate 19 of the insulating wall 18, immediately adjacent the impeller housing and thus reduces possible fire hazards.

The outer wall 16 of the housing, together with walls 18 and 19, are formed with dished areas to conform to the taper of the outer edges of the vanes, thus permitting placement of bearing 26b as close as possible to the impeller, to keep the overhanging weight on the shaft 27 to a practical minimum.

As above pointed out, in certain fields of use of blowers, such as for example in connection with a commercial baking oven, when the oven is shut down, the residual heat from the heating unit frequently builds up the temperature adjacent the impeller element to a very substantial extent, and sometimes approximating 1500° F. Thus, when the blower is not operating, this residual heat is transmitted from the impeller element and its housing directly to the impeller shaft and the bearings, which results in warping and binding of the parts and the numerous disadvantages above pointed out. In the blower construction, embodying the present invention, when the baking oven is shut down, the heating system is vented to a stack, and there is created in the heating system of the oven, a natural draft, and which draft will serve to cause air, at room temperature, to be drawn inwardly through the passageway of the hollow shaft 27, into the impeller housing and the heating system, and thus serves to maintain the bearings adequately cool, and avoids the above mentioned difficulties heretofore experienced with prior constructions of blowers employed for handling high temperature air or gases.

While we have used the term "blower" herein, and in the claim, it is intended that the term should be accorded a generic meaning as applying to a device serving either as a blower or as an exhauster.

Although we have herein shown and described a preferred embodiment of our invention, manifestly it is capable of modification and rearrangement of parts without departing from the spirit and scope thereof. We do not, therefore, wish to be understood as limiting this invention to the precise form herein disclosed, except as we may be so limited by the appended claim.

We claim as our invention:

A blower of the character described, comprising a rotatable shaft, axially spaced apart inner and outer bearings providing journal support for said shaft, an impeller housing surrounding one end of the shaft and having inlet and outlet openings and a closed outer wall disposed adjacent said inner bearing, said outer wall having a substantial thickness of insulation, and an impeller mounted on said end of the shaft, within the housing, said impeller having a plurality of circumferentially spaced vanes, tapering outwardly in transverse dimension from the central area toward the outer areas thereof, said closed outer wall of the housing having an inwardly dished portion, conforming generally to the taper of said vanes, to permit locating the inner bearing within said dished area, said dished portion constituting an insulated wall between and closely adjacent said inner bearing and said impeller, said shaft having an air passageway opening at one end into said central area of the impeller and having its opposite end in open communication with the atmosphere, beyond said bearings, whereby, upon rotation of the impeller atmosphere is positively drawn through said passageway into said housing for effecting an air cooling of said bearings.

CHRIS KLEIN.
RICHARD C. SKARIN.
WILLIAM G. TINKER.

REFERENCES CITED

The following references are of record in the file of this patent:

UNITED STATES PATENTS

| Number | Name | Date |
|---|---|---|
| 390,508 | Mosher et al. | Oct. 2, 1888 |
| 616,590 | Symour | Dec. 27, 1898 |
| 1,773,909 | Korb | Aug. 26, 1930 |
| 2,439,127 | Dailey et al. | Apr. 6, 1948 |
| 2,441,121 | Nygren | May 4, 1948 |
| 2,518,815 | Polk | Aug. 15, 1950 |

FOREIGN PATENTS

| Number | Country | Date |
|---|---|---|
| 1,033 | Great Britain | Oct. 11, 1906 |
| 555,385 | France | June 29, 1923 |
| 612,382 | Germany | Apr. 4, 1935 |